No. 757,217. PATENTED APR. 12, 1904.
E. S. NEWTON.
MEANS FOR ADJUSTING ENGINE VALVES.
APPLICATION FILED JUNE 16, 1902.
NO MODEL.
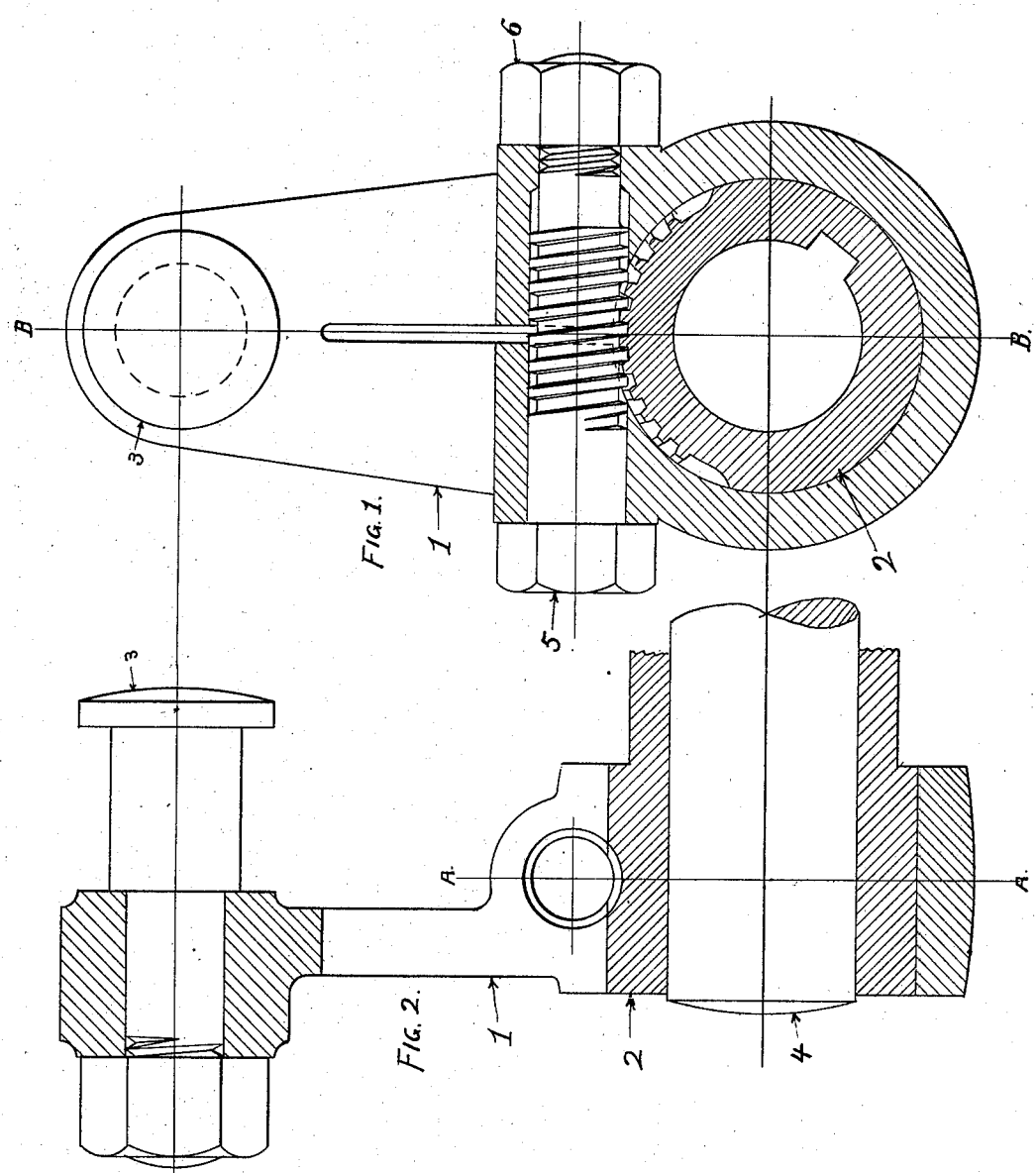
WITNESSES.
INVENTOR.
Edward S. Newton
By Benedict, Morsell and Green
Attys.

No. 757,217. Patented April 12, 1904.

UNITED STATES PATENT OFFICE.

EDWARD S. NEWTON, OF FOND DU LAC, WISCONSIN.

MEANS FOR ADJUSTING ENGINE-VALVES.

SPECIFICATION forming part of Letters Patent No. 757,217, dated April 12, 1904.

Application filed June 16, 1902. Serial No. 111,863. (No model.)

*To all whom it may concern:*

Be it known that I, EDWARD S. NEWTON, residing at Fond du Lac, in the county of Fond du Lac and State of Wisconsin, have invented a new and useful Improvement in Means for Adjusting Engine-Valves, of which the following is a description, reference being had to the accompanying drawings, which are a part of this specification.

This invention relates to improvements in mechanism for accomplishing the adjustment of valves for governing the compression and release of the steam in engines, and more particularly to mechanism for accomplishing the adjustment of the exhaust-valves in engines of the "Corliss" type.

In order to obtain satisfactory results with the exhaust-valves of Corliss engines, it is necessary to occasionally adjust the same, and heretofore this has usually been done by changing or varying the length of the valve-actuating rod. This procedure is objectionable, because in varying the length of said rod the angularity of the same is also varied, and by so varying the angularity the proper movement of the valve is apt not to be obtained.

The object of this invention is to provide for the exhaust-valve stem of Corliss engines a sleeve or bushing for said stem, a rocker-arm, and means connecting said sleeve and arm of such construction that the proper adjustment of the valve may be accomplished without impairing the proper movement of the valve itself.

I am aware that a result somewhat similar to the result I attain has been heretofore accomplished to a limited extent by moving a sleeve or bushing within the rocker-arm by means of set-screws.

The above and other objects I attain by means of the parts constructed as described in the specification and illustrated in the accompanying drawings, in which—

Figure 1 is an end view of the parts embodying this invention with the valve-stem omitted, and a portion of this view is taken on line *a a* in Fig. 2 and shown in cross-section. Fig. 2 is a sectional elevation of the parts embodying this invention, including the valve-stem, and is taken on line *b b* in Fig. 1, with the worm hereinafter described omitted.

Throughout both views like elements are denoted by like characters.

In carrying out this invention I employ a rocker-arm 1, provided with a transverse aperture at its inner end adapted to receive revolubly loose therein a sleeve 2, keyed on the valve-stem 4. At its outer end the rocker-arm is provided with a wrist-pin 3, by which the rocker-arm may be connected to suitable means, as a reciprocating valve-actuating rod, for oscillating the arm and the valve-stem 4. The sleeve 2, advisably made of steel, is provided with worm-gear teeth either entirely or partially around it circumferentially, as shown in the drawings. The rocker-arm is provided with a transverse bore or worm-aperture at a right angle to and intersecting the outer portion of the sleeve and valve-stem aperture, in which worm-aperture a headed bolt-like worm 5 is revoluble, the worm gearing with the teeth on sleeve 2. A nut 6 turns by screw-thread on the non-headed end of the worm 5. The rocker-arm is split by a slot from the sleeve and valve-stem aperture outwardly, the slot intersecting the worm-aperture.

By providing sleeve 2 an inexpensive construction is obtained, as the cutting of worm-gear in the longer and more unwieldy valve-stem is obviated. Also by splitting the rocker-arm outwardly or along the arm from the sleeve and valve-stem aperture and placing the worm on the same side of that aperture a very compact, strong, and desirable construction is secured.

It will be understood that by loosening nut 6 and then rotating the worm 5 the sleeve and valve-stem 4 will be rotated, and thereby adjusted satisfactorily, and that then by turning down the nut 6 the worm will be pinched by the clamping of the parts of the rocker-arm thereon, binding the members in position.

Having thus described my invention, I claim—

1. In combination, a valve-stem, a sleeve keyed on the valve-stem and provided on its circumference with worm-gear teeth, a rocker-arm on the sleeve about the valve-stem the rocker-arm being split from the sleeve and valve-stem aperture in the direction of its length toward its wrist-pin extremity, a worm revoluble in the rocker-arm and gearing with said sleeve, the worm being disposed at a right angle to the axis of the valve-stem and located on the side of the sleeve that is toward the wrist of the rocker-arm, and means for pinching the split rocker-arm to the worm.

2. In combination, a valve-stem provided peripherally with worm-gear teeth, a rocker-arm about the valve-stem the rocker-arm being split from its valve-stem aperture in the direction of its length toward its wrist-pin extremity, a worm revoluble in the rocker-arm and gearing with said worm-teeth, the worm being disposed at a right angle to the axis of the valve-stem and located on that side of the valve-stem that is toward the wrist of the rocker-arm, and means for pinching the split rocker-arm to the worm.

In testimony whereof I affix my signature in presence of two witnesses.

EDWARD S. NEWTON.

Witnesses:
C. E. PLUM,
F. R. TABOR.